UNITED STATES PATENT OFFICE.

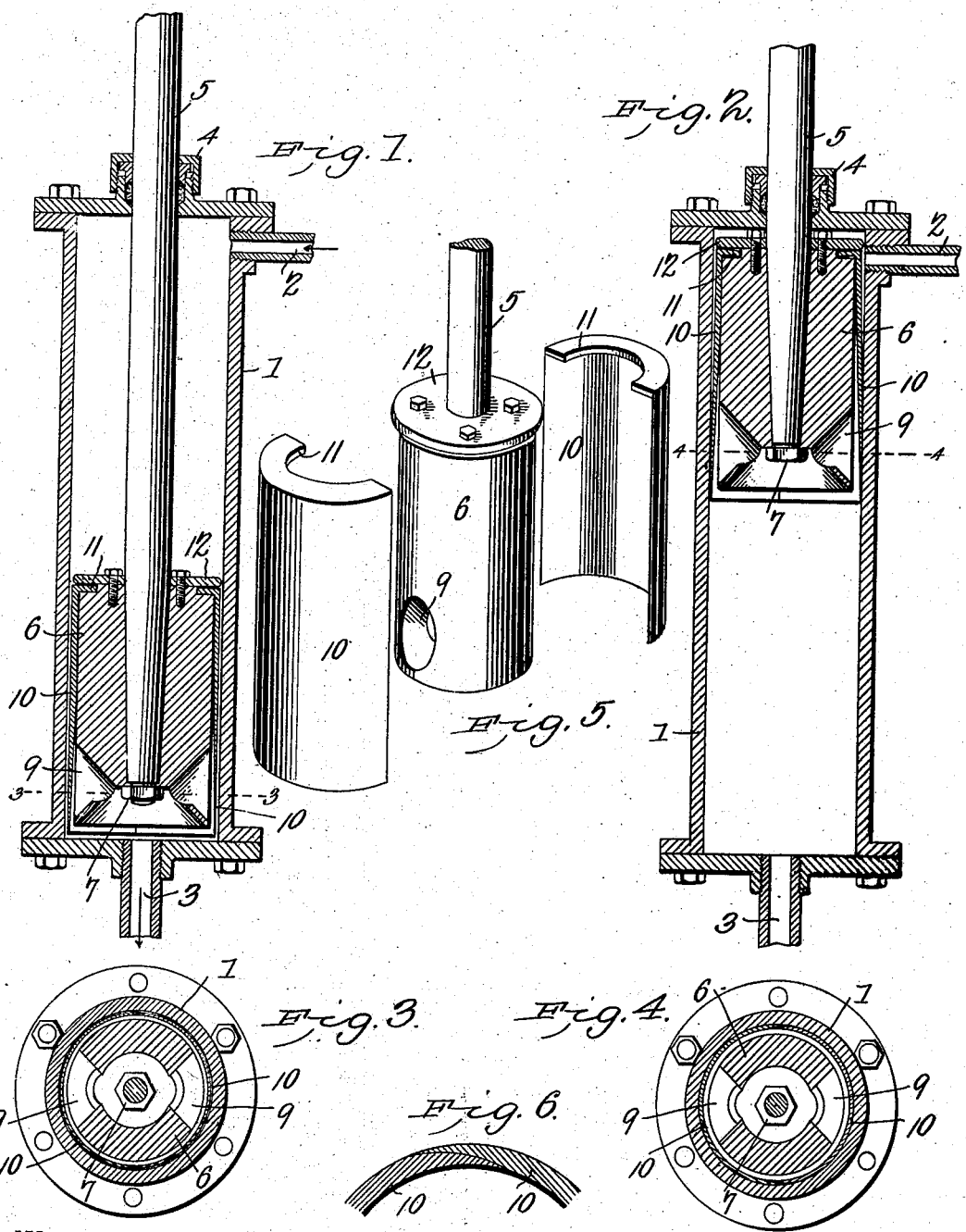

THOMAS R. GREEN, OF RIVERSIDE, CALIFORNIA.

PISTON FOR AIR-PUMPS.

No. 894,882. Specification of Letters Patent. Patented Aug. 4, 1908.

Application filed January 27, 1903. Serial No. 140,800.

*To all whom it may concern:*

Be it known that I, THOMAS R. GREEN, a citizen of the United States, residing at Riverside, in the county of Riverside and State of California, have invented a new and useful Piston for Air-Pumps, of which the following is a specification.

This invention relates to pumping devices of that class employed for compressing air and other fluids.

The principal object of the invention is to provide an apparatus which may be operated at a very rapid rate of speed without heating through frictional contact between the moving parts, and in which the air or other fluid to be compressed will flow freely between the periphery of the piston and the bore of the cylinder during the idle or non-compression stroke of the piston, and will serve to prevent frictional contact between the two, and to absorb the heat resulting from the friction during the compression stroke.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawing:—Figure 1 is a sectional elevation of a portion of an air pump or air compressing device constructed in accordance with the invention, the piston being shown in the position assumed immediately after the starting of the return or non-compression stroke. Fig. 2 is a view similar to Fig. 1, showing the position to which the movable parts of the piston are adjusted during the compression stroke. Fig. 3 is a sectional plan view of the piston and cylinder on the line 3—3 of Fig. 1. Fig. 4 is a similar view on the line 4—4 of Fig. 2. Fig. 5 is a detail perspective view of the piston detached. Fig. 6 is an enlarged view illustrating the overlapping joint of the piston members.

Similar numerals of reference are employed to indicate corresponding parts throughout the several figures of the drawings.

The cylinder 1 which may be of any ordinary construction, is provided at one end with an inlet port 2 that is connected to a tank or reservoir containing a supply of air or other fluid under pressure. At the opposite end of the cylinder is a discharge port 3 which may be connected to a receiving reservoir where the air or other fluid compressed or pumped is to be stored or utilized.

At one end of the cylinder is a stuffing box 4 through which passes a piston rod 5 provided at its lower end with a cylindrical block 6 having a longitudinal opening for the passage of a tapered portion of the piston rod, the latter being provided at its lower end with a threaded portion for the reception of a nut 7 by which the block and piston rod are secured together. The lower face of the block is recessed to receive the nut, and from this recessed portion extend diametrically opposed radiating passages 9 which terminate at the periphery of the block, this serving to permit the passage of air or other fluid compressed into direct contact with the movable members of the piston.

The movable members of the piston comprise two semi-cylindrical sections 10 formed of brass or other suitable material, the lower edges of which are reduced in thickness, tapering almost to a knife edge, and at the upper edge of each member is an inwardly extending semi-circular flange 11 adapted to fit in a corresponding groove or recess formed in the upper face of the block. The longitudinal edges of these sections 10 are further tapered, as shown more clearly in Fig. 6, in order to form overlapping joints which will permit expansion and contraction, while at the same time remaining sufficiently tight to prevent the passage of the fluid through the joints.

Immediately above the top of the block is a ring 12 which is held in place by screws or other securing devices, the ring forming the upper wall of the annular groove in the top of the block, and the width of this groove being greater than the thickness of the flanges 11, so that said flanges may freely rock therein as the movable members expand and contract, this construction serving further to permit the ready detachment of the members 10 of the piston as soon as the latter is removed from the cylinder.

If the parts are in the position shown in Fig. 1, having completed the compression stroke, and commencing the return stroke, there will be a slight volume of air under the piston, and a volume of air above the piston, the pressure of the latter being say fifty pounds. As long as the pressure below the piston is greater than fifty pounds, the two semi-cylindrical sections of the piston will be held outward in contact with the wall of the cylinder, but very shortly after the up stroke has commenced, the upward travel of the piston being comparatively rapid, will, in opposing the fifty pounds pressure, result in an increase of pressure above the piston, and thereupon the semi-cylindrical piston members will be forced inward and leave a clear annular space between the piston and the wall of the cylinder, this space being of greater area than the area of the inlet port 2, and the air being compelled to flow down through the space between the piston and the bore of the cylinder, thus preventing frictional contact between the piston and the cylinder, while at the same time the volume of passing air will absorb the heat generated by friction from the compression stroke. By the time the piston reaches the limit of its upward movement, the pressures above and below the piston will be nearly equal, but as soon as the down stroke is started, the air below the piston will be compressed and will act through the passages formed in the piston body to force the piston members 10 outward into contact with the wall of the cylinder, and such parts will be maintained in engagement with the wall of the cylinder, so as to prevent the escape of any of the air being compressed, all of such air being compelled to pass up through the escape port 3.

It will be noted that the movable semi-cylindrical piston members are perfectly free and can swing outward or inward from their supports at the top of the piston body, while the overlapping joints between the sections are of such nature as to allow the requisite expansion and contraction without leakage.

I claim:—

1. The combination with a pumping or compression cylinder having at one end an inlet for fluid, and at the opposite end an outlet for fluid after compression, of a piston rod, a piston body carried thereby and provided at its upper edge with a continuous annular groove or recess, and a pair of loosely mounted metallic semi-cylindrical piston sections having inwardly extending flanges fitting within said groove or recess and held in engagement with the bore of the cylinder by the fluid pressure during the compression stroke, the edges of the lower free ends of said members being arranged to overlap and being tapered in thickness, the fluid between the piston and the inlet serving to move said piston sections inward during their return stroke, thereby forming an annular space between the piston sections and the bore of the cylinder, the area of said space being greater than the area of the inlet port.

2. The combination with a cylinder having an inlet at one end and an outlet at the opposite end, of a piston including a substantially cylindrical block having at one end an annular groove or recess, a detachable plate forming the upper wall of said recess, a pair of movable piston sections of approximately semi-cylindrical form, each having at its upper end an inwardly extending flange seated within the recess and of a thickness less than the width of such recess, the opposite ends of the sections being arranged to overlap and being free to move outward into engagement with the cylinder, and the piston being provided with an opening for directing a portion of the fluid being compressed against the inner faces of said sections, substantially as specified.

In testimony that I claim the foregoing as my own, I have hereto affixed my signature in the presence of two witnesses.

THOMAS R. GREEN.

Witnesses:
J. H. JOCHUM, Jr.,
J. ROSS COLHOUN.